Feb. 14, 1950 K. M. ARMANTROUT 2,497,253
LUBRICATING MEANS FOR TRANSMISSIONS
Filed June 26, 1946 2 Sheets-Sheet 1

Inventor:
Kenneth M. Armantrout
By Edward C. Fitzhugh
Atty.

Feb. 14, 1950     K. M. ARMANTROUT     2,497,253
LUBRICATING MEANS FOR TRANSMISSIONS
Filed June 26, 1946     2 Sheets-Sheet 2
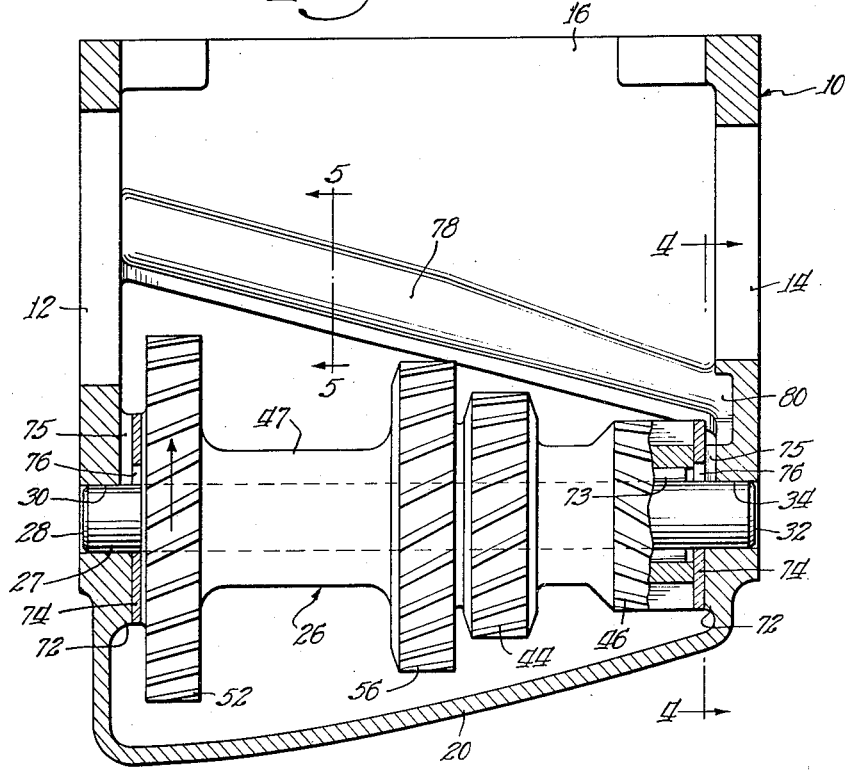
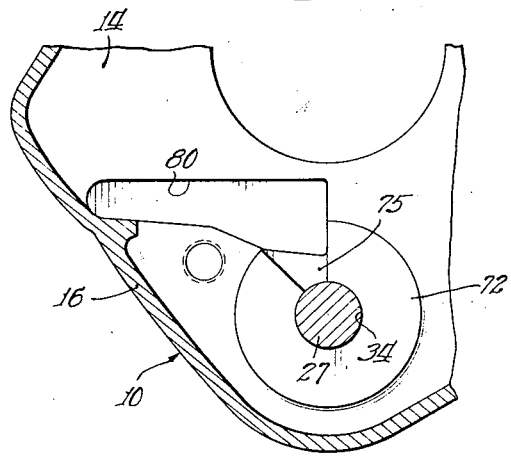

Patented Feb. 14, 1950

2,497,253

UNITED STATES PATENT OFFICE 2,497,253

LUBRICATING MEANS FOR TRANSMISSIONS

Kenneth M. Armantrout, Muncie, Ind., assignor to Borg-Warner Corporation, Chicago, Ill., a corporation of Illinois Application June 26, 1946, Serial No. 679,441

8 Claims. (Cl. 184—11)

1

This invention relates to improvements in transmissions and particularly to transmissions of the type having speed-change gears rotatably mounted on bearings in the transmission casing, the gears being substantially immersed in a lubricant reservoir in the casing providing lubricant for the bearings.

A well-known transmission of this type comprises driving and driven shafts having helical gears cooperating with gears of a gear cluster substantially submerged in the lubricant reservoir of the transmission casing and rotatable on front and rear bearings on a countershaft. The gears of the gear cluster are formed to decrease in diameter from the front end to the rear end of the cluster to provide different speed ratios and, to accommodate the gears, the bottom wall of the casing slopes downwardly between these ends of the cluster so as to be deeper adjacent the largest gear. During operation of the transmission, at least two of the larger gears of the countershaft gear cluster are in constant meshing engagement with gears mounted respectively on the driving and driven shafts and function as pumps causing the lubricant to flow continuously from the rear to the front of the casing. This pumping action is effected as these large gears throw the lubricant from their peripheries toward the front of the casing, a portion of the oil being splashed on the side walls of the casing adjacent the front wall and flowing downwardly into the reservoir. Due to this action of the gears, the lubricant accumulates in the front end of the casing and the rear bearing supporting one end of the gear cluster is not substantially submerged in the lubricant and does not receive an adequate supply of lubricant to afford satisfactory lubrication.

It is an object of my invention to provide suitable lubricating means in a transmission of the type such as described for insuring a plentiful supply of lubricant to the bearings supporting a plurality of gears in a transmission casing.

It is a further object of my invention to provide means for directing lubricant, thrown by centrifugal force from a gear cluster, to a bearing rotatably mounting the same in a transmission casing to afford adequate lubrication of said bearing.

Other objects will appear from the following description and claims when considered together with the accompanying drawings in which:

2

Figure 2:
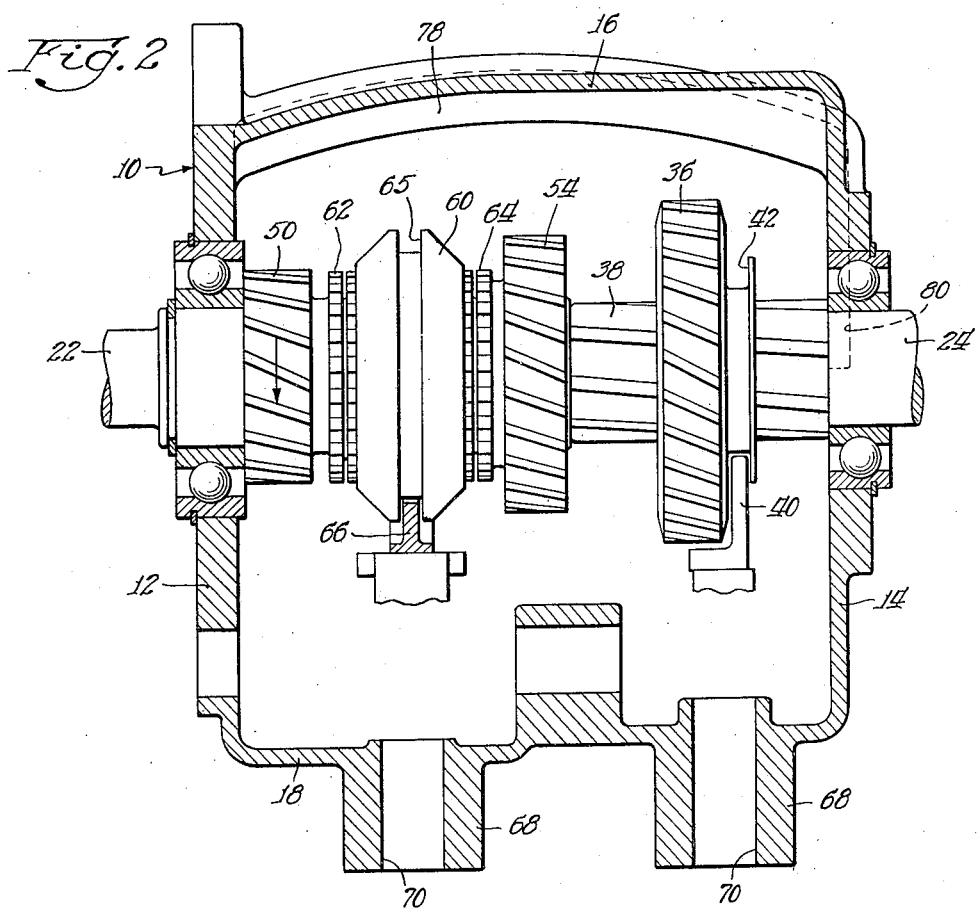
Fig. 2 is a top view of the transmission with the casing shown in section.

Fig. 3 is a side view of the transmission, the casing being shown in section and the gears illustrated in Fig. 2 being removed to more clearly show the invention;

Fig. 4 is a section taken along the lines 4—4 of Fig. 3; and

Figure 5:
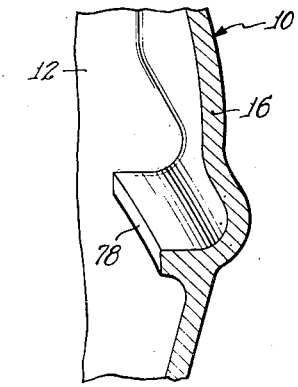

Fig. 5 is a section taken along the lines 5—5 of Fig. 3.

Referring to the drawings, the automobile transmission selected for purposes of illustrating my invention is of the countershaft type employing a conventional and well-known change-speed gear arrangement. More particularly, the transmission comprises a casing generally designated 10 having front and rear walls 12 and 14, side walls 16 and 18, and a bottom wall 20 sloping downwardly from the rear wall 14 toward the front wall 12 and defining with said walls 12 and 14 and the side walls a lubricating oil reservoir or chamber deeper at the front end of the casing than at the rear end thereof for receiving gears submerged therein and hereinafter described.

A drive shaft 22 and a driven shaft 24 are journaled in the upper portions of the walls 12 and 14, respectively, with the axes of said shafts being disposed in alignment and the drive shaft 22 having a rearward hollow portion receiving a bearing rotatably mounting a forward piloted end of the driven shaft 24. Disposed beneath the drive and driven shafts 22 and 24 is a countershaft assembly generally designated 26 and comprising a non-rotatable shaft 27 having its front end 28 within an opening 30 in the front wall 12 of the casing, the rear end 32 of the shaft being received within an opening 34 in the rear wall 14 of the casing.

Figure 1:
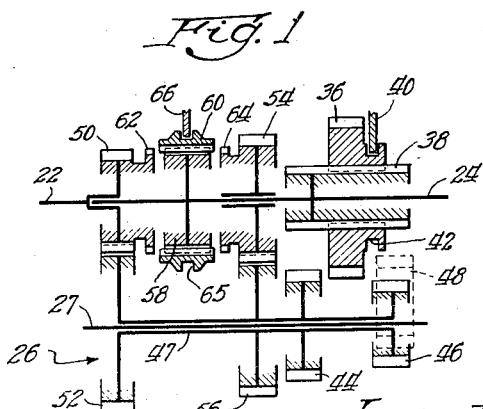
Fig. 1 is a schematic view of a transmission embodying my invention.

Driven shaft 24 carries a gear 36 connected to it by splines 38, said gear 36 being axially shiftable on said shaft 24, by means of a shifter fork 40 received within an annular channel 42 in the gear, toward the low speed gear 44 or the reverse gear 46 of the gear cluster 47 rotatably mounted on the shaft 27 and forming a portion of the countershaft assembly 26, said gear 36 thereby being adapted to selectively engage the low speed gear 44 or the reverse idler 48 (Fig. 1) which is in constant mesh with gear 46.

The rear portion of the shaft 22 is provided with a gear 50 in constant mesh with a gear 52 of the gear cluster 47. Journaled on the shaft 24 is a second speed gear 54 in constant mesh with gear 56 of the gear cluster 47. Intermediate the gears 50 and 54 is a hub 58 drivingly connected to the driven shaft 24 and having splined thereon an axially shiftable clutch sleeve 60 selectively engageable with clutch teeth 62 on the gear 50 or clutch teeth 64 on the gear 54. For this purpose, the clutch sleeve 60 is provided with a channel 65 receiving a shifter fork 66 for actuating the sleeve axially of the driven shaft 24. It may be noted from a consideration of Fig. 2 that the side wall 18 of the casing 10 is provided with outwardly extending bosses 68 having openings 70 through which suitable control mechanism may be received within the casing for manipulating the shifter forks 40 and 66.

In the operation of the transmission, low speed is obtained by shifting the gear 36 into engagement with the gear 44, the drive thereby being transmitted by the gear 50 of the driving shaft 22 and the gear 52 of the gear cluster 47 to the gear 44 and thence to the gear 36 to drive the driven shaft 24. To obtain second speed, the clutch sleeve 60 is shifted axially toward the gear 54 to engage the clutch teeth 64 thereon whereby drive is transmitted by the gear 50 on the driving shaft 22 and gear 52 of the cluster 47 to the gear 56 in constant mesh with the gear 54 which is drivingly connected by the clutch sleeve 60 to the driven shaft by the aforesaid clutch engagement of the sleeve and gear 54. Third speed is effected by shifting the clutch sleeve 60 toward the gear 50 on the driving shaft 22 and into engagement with the clutch teeth 62 of said gear whereby the driving shaft and driven shaft are coupled for direct drive. Reverse can be obtained by shifting the gear 36 axially of the driven shaft into engagement with the reverse idler 48 in constant mesh with the reverse gear 46, the latter gear causing the idler 48 to rotate the gear 36 and the driven shaft in a direction opposite to that of the drive shaft.

Referring now to Fig. 3, it may be noted that the countershaft assembly 26, with regard to its specific structure and mounting of the same in the casing 10, comprises the shaft 27 having its ends 28 and 32 fixed within openings 30 and 34 in annular bosses 72 on the front and rear walls 12 and 14 of the casing 10, the shaft rotatably mounting the gear cluster 47 by means of needle bearings 73 between each end of the gear cluster and the shaft. A bearing member in the form of a thrust washer 74 is disposed over each end of the shaft 27 and disposed between the adjacent sides of each end gear and annular boss 72. It may be noted that the gears forming the gear cluster 47 are of helical type and, therefore, create end thrust when under load. As these helical gears have left-hand helical teeth, they will tend to move the gear cluster toward the rear of the transmission under the effect of end thrust and cause considerable thrust or pressure on the thrust washer between the rear of the gear cluster and the end wall 14 of the casing. As a result, this thrust washer requires much lubrication and must be constantly supplied with an adequate quantity of lubricant to satisfactorily function.

For the purpose of supplying oil to the thrust washers 74 and bearings 73, each annular boss 72 is provided with a radially extending vertically disposed lubricant passageway 75 and the adjacent annular washer 74 is provided with a passageway 76 whereby lubricant passing through the passageway 75 in the boss 72 will flow into the passageway 76 in the washer and then to the needle bearings 73 to afford lubrication of the same and the thrust washer. The thrust washers are formed and arranged in such manner as to be maintained on the shaft 27 with the passageways 76 in communication with the passageways 75 in the bosses 72 as disclosed in the copending application of Edward S. Russey Serial No. 607,330, filed July 27, 1945.

The static oil level within the casing 10 is such that the gear cluster and associated washers are substantially submerged in the lubricant. The helical gears 52, 56, 44 and 46 of the gear cluster, disposed in the lubricant, have diameters which decrease in the order named, as shown in Fig. 3, from the front to the rear of the cluster. In the operation of the transmission described, the gear cluster 47 is constantly rotated as the gear 52 of the cluster is in constant mesh with the gear 50 of the driving shaft. During the rotation of the gear cluster, the lubricant is continuously conveyed from the rear of the reservoir to the front thereof by the action of the gears. This flow of the lubricant is caused primarily by the lubricant being thrown off by centrifugal force from the peripheries of the progressively larger gears of the cluster toward the front wall 12 of the casing, a portion of the lubricant impinging on the side walls 16 and 18 of the casing surrounding these gears and flowing downwardly into the reservoir. Also, due to the inclination of the helical teeth of gears 52 and 56 of the cluster and the direction of the rotation of the gear cluster as indicated by the arrow in Fig. 3, these gears act to pump the lubricant from the rear to the front of the reservoir. In this way, most of the lubricant accumulates in the front end of the reservoir with the result that the rear end of the countershaft assembly is no longer substantially immersed in the lubricant and lubricant will not enter the passage 75 in the boss 72 on the rear wall 14 of the casing 10 and flow into the passage 76 in the adjacent washer 74 to the needle bearings 73 supporting the rear end of the gear cluster.

To provide an adequate supply of lubricant for the needle bearings 73 and thrust washer 74 on the end 32 of the shaft 27 and thereby afford adequate lubrication of the same during the operation of the transmission, I have provided a lubricant-collecting and conveying flange 78 formed on the side wall 16 of the casing within the casing and extending between and integrally joined with the front and rear walls 12 and 14 of the casing, the flange being disposed at an angle with respect to the axis of the gear cluster and extending downwardly and rearwardly from the front wall 12 to the rear wall 14 to communicate with a recess 80 in the rear wall. It may be noted from an inspection of Fig. 3 that the flange 78 is formed on the side wall 16 in such manner that it is directly above each of the gears and by reason of its location and angle of inclination, as well as the fact that the flange forms with the side wall 16 a trough arcuate in cross section, the flange will collect some of the lubricant which is thrown by the rotating gears toward and onto the upper portion of the side wall 16 and flows downwardly into the flange. The flange thereafter conveys the lubricant into the recess 80 in the rear wall 14 of the casing and through the passage 75 in the boss 72 of said wall and the passage 76 in the washer 74 to the needle bearings 73 disposed between the end 32 of the shaft 27 and the gear cluster to thereby supply the needle bearings and washer with a sufficient quantity of lubricant to afford satisfactory lubrication of the same.

While I have described the invention with respect to providing proper lubrication for a transmission of the countershaft type, it will be apparent that my invention is equally applicable to other transmissions where a similar problem exists and to which my invention may be applied to afford a solution of the problem.

I claim:

1. In a transmission mechanism, the combination with a casing having a fluid-lubricant chamber therein, of a gear cluster in said chamber and rotating on bearing members at each end of the cluster, said cluster including helical gears decreasing in diameter from one end of the cluster to the other and adapted to exert thrust on one of the bearing members adjacent said second-named end of the cluster, and a lubricant-conveying conduit on a side wall of said casing and inclined downwardly from said first-named end of said cluster to said second-named end and adapted to collect the lubricant splashed by the rotation of said gears and to deliver the lubricant to the bearing members at said second-named end of the gear cluster.

2. In a transmission mechanism, the combination with a casing having a fluid-lubricant chamber therein, of a shaft in said chamber having a plurality of helical gears disposed thereon and rotatably disposed in said casing, said gears decreasing in diameter from one end of the shaft to the other, a thrust washer disposed on said second-named end of said shaft between an end wall of said casing and the gear adjacent thereto and receiving thrust from said gear, and a lubricant-conveying conduit on a side wall of said casing and inclined downwardly from said first-mentioned end of said shaft to said second-named end and adapted to collect the lubricant splashed by the rotation of said gears and to deliver the lubricant to said thrust washer.

3. In a transmission mechanism, the combination with a casing having a fluid-lubricant chamber therein, of a shaft in said chamber having a gear disposed thereon and rotatably disposed in said casing, said gear having helical teeth adapted to pump lubricant from one end of said shaft toward the other, and a lubricant-conveying conduit on a side wall of said casing and inclined downwardly from said second-named end of said shaft to said first-named end and adapted to collect the lubricant splashed by the rotation of said gear and to deliver the lubricant to said first-named end of said shaft.

4. In a transmission mechanism, the combination with a casing having a fluid-lubricant chamber therein, of a shaft in said chamber having a set of gears disposed thereon and rotatably disposed in said casing, at least one gear of said set having helical teeth adapted to pump lubricant from one end of said shaft toward the other, a thrust washer disposed on said first-named end of said shaft between a gear of said set and an adjacent wall of said casing and receiving thrust from said last-mentioned gear, and a lubricant-conveying conduit on another wall of said casing and inclined downwardly from said second-named end of said shaft to said first-named end and adapted to collect the lubricant splashed by the rotation of said gears and to deliver the lubricant to said thrust washer.

5. In a transmission mechanism, the combination with a casing having a fluid-lubricant chamber therein, of a gear cluster in said chamber and rotating on bearing members at each end of the cluster, said cluster including gears having helical teeth adapted to pump lubricant from one end of said cluster to the other and to exert thrust on one of the bearing members adjacent said first-named end of the cluster, and a lubricant-conveying conduit on a wall of said casing and inclined downwardly from said second-named end of said cluster to said first-named end and adapted to collect the lubricant splashed by the rotation of said gears and to deliver the lubricant to the bearing members at said first-named end of the gear cluster.

6. In a transmission mechanism, the combination with a casing having a fluid-lubricant chamber therein, of a shaft in said chamber having a plurality of gears disposed thereon and rotatably disposed in said casing, said gears decreasing in diameter from one end of said shaft to the other and having helical teeth adapted to pump lubricant from said second-mentioned end of said shaft to said first-named end, and a lubricant-conveying conduit on a side wall of said casing and inclined downwardly from said first-named end of said shaft to said second-named end and adapted to collect the lubricant splashed by the rotation of said gears and to deliver the lubricant to said second-named end of said shaft.

7. In a transmission mechanism, the combination with a casing having a fluid-lubricant chamber therein, of a gear cluster in said chamber and rotatably disposed at each end on bearing members in said casing, the gears of said gear cluster decreasing in diameter from one end of said cluster to the other and at least one of said gears having helical teeth adapted to pump lubricant from said second-named end of said cluster to said first-named end and to exert thrust on one of the bearing members adjacent said second-named end of the cluster, and a lubricant-conveying conduit on a wall of said casing and inclined downwardly from said first-named end of said cluster to said second-named end and adapted to collect the lubricant splashed by the rotation of said gears and to deliver the lubricant to the bearing members adjacent said second-named end of the gear cluster.

8. In a transmission mechanism, the combination with a casing having a fluid-lubricant chamber therein, axially aligned driving and driven shafts rotatably mounted in spaced walls of said casing, respectively, speed-change gears on said shafts, a countershaft in said chamber having a plurality of gears disposed thereon and rotatably disposed in said casing, said last-named gears having helical teeth cooperating with said first-named gears and adapted to pump lubricant from one end of said countershaft to the other, and a lubricant-conveying conduit on a side wall of said casing and inclined downwardly from said second-named end of said countershaft to said first-named end and adapted to collect lubricant splashed by the rotation of said countershaft gears and to deliver the lubricant to said first-named end of said countershaft.

KENNETH M. ARMANTROUT.

REFERENCES CITED

The following references are of record in the file of this patent:

UNITED STATES PATENTS

| Number | Name | Date |
| --- | --- | --- |
| 2,085,019 | Griswold | June 29, 1937 |
| 2,085,814 | Matthews | July 6, 1937 |
| 2,168,970 | Buckendale | Aug. 8, 1939 |

FOREIGN PATENTS

| Number | Country | Date |
| --- | --- | --- |
| 40,786 | Norway | Jan. 19, 1925 |